United States Patent
Landau

(10) Patent No.: US 6,549,980 B2
(45) Date of Patent: Apr. 15, 2003

(54) MANUFACTURING PROCESS FOR SOFTWARE RAID DISK SETS IN A COMPUTER SYSTEM

(75) Inventor: Richard B. Landau, Austin, TX (US)

(73) Assignee: Dell Pruducts L.P., Round Rock, TX (US)

( * ) Notice: Subject to any disclaimer, the term of this patent is extended or adjusted under 35 U.S.C. 154(b) by 85 days.

(21) Appl. No.: 09/909,295

(22) Filed: Jul. 19, 2001

(65) Prior Publication Data
US 2003/0018850 A1 Jan. 23, 2003

(51) Int. Cl.[7] .............................................. G06F 13/00
(52) U.S. Cl. ........................ 711/114; 711/162; 711/165; 714/6
(58) Field of Search ................................ 711/114, 165, 711/162; 714/6

(56) References Cited

U.S. PATENT DOCUMENTS

| | | | |
|---|---|---|---|
| 4,740,890 A | 4/1988 | William ....................... 713/200 |
| 4,785,361 A | 11/1988 | Brotby .......................... 360/60 |
| 4,953,209 A | 8/1990 | Ryder, Sr. et al. ............. 705/59 |
| 5,022,077 A | 6/1991 | Bealkowski et al. ........ 711/163 |
| 5,103,476 A | 4/1992 | Waite et al. ................... 705/59 |
| 5,113,518 A | 5/1992 | Durst, Jr. et al. ........... 713/200 |
| 5,155,847 A | 10/1992 | Kirouac et al. ............. 709/221 |
| 5,175,852 A | 12/1992 | Johnson et al. ................ 707/8 |
| 5,212,729 A | 5/1993 | Schafer ......................... 705/55 |
| 5,230,052 A | 7/1993 | Dayan et al. ................... 713/2 |
| 5,247,683 A | 9/1993 | Holmes et al. .............. 709/221 |
| 5,325,532 A | 6/1994 | Crosswy et al. ............... 713/2 |
| 5,371,792 A | 12/1994 | Asai et al. ..................... 705/59 |
| 5,418,918 A | 5/1995 | Vander Kamp et al. ........ 713/2 |
| 5,421,006 A | 5/1995 | Jablon et al. ................. 714/36 |
| 5,421,009 A | 5/1995 | Platt ............................. 709/221 |
| 5,423,023 A | 6/1995 | Batch et al. ................. 717/117 |
| 5,459,867 A | 10/1995 | Adams et al. ............... 709/321 |
| 5,463,735 A | 10/1995 | Pascucci et al. ............. 709/222 |
| 5,471,617 A | 11/1995 | Farrand et al. .............. 709/100 |
| 5,499,357 A | 3/1996 | Sonty et al. ................. 710/104 |
| 5,504,904 A | 4/1996 | Dayan et al. ................... 713/1 |
| 5,541,991 A | 7/1996 | Benson et al. .............. 713/202 |
| 5,553,143 A | 9/1996 | Ross et al. ..................... 705/59 |
| 5,652,868 A | 7/1997 | Williams ....................... 703/23 |
| 5,671,412 A | 9/1997 | Christiano ................ 707/104.1 |
| 5,684,974 A | 11/1997 | Onodera ....................... 711/202 |
| 5,689,560 A | 11/1997 | Cooper et al. ................. 705/52 |
| 5,694,583 A | 12/1997 | Williams et al. ............... 703/24 |
| 5,745,669 A | 4/1998 | Hugard et al. .................. 714/3 |
| 5,752,004 A | 5/1998 | Blood ............................ 714/2 |
| 5,771,347 A | 6/1998 | Grantz et al. ................ 713/200 |
| 5,794,052 A | 8/1998 | Harding ....................... 717/178 |
| 5,809,230 A | 9/1998 | Pereira ......................... 713/200 |
| 5,845,281 A | 12/1998 | Benson et al. .................. 707/9 |
| 5,933,497 A | 8/1999 | Beetcher et al. ............... 705/59 |
| 5,960,204 A | 9/1999 | Yinger et al. ................ 717/176 |
| 5,995,756 A | 11/1999 | Herrmann ..................... 717/178 |
| 6,151,708 A | 11/2000 | Pedrizetti et al. ............ 717/173 |
| 6,202,207 B1 | 3/2001 | Donohue ...................... 717/173 |
| 6,378,038 B1 * | 4/2002 | Richardson et al. ......... 711/114 |

* cited by examiner

Primary Examiner—Reginald G. Bragdon
Assistant Examiner—Jasmine Song
(74) Attorney, Agent, or Firm—Haynes and Boone, LLP

(57) ABSTRACT

A method of manufacturing a computer includes creating a reference two-disk software RAID pair, the software RAID pair having desired partitions mirrored by an operating system. The method also includes extracting a master image from one disk of the reference disk pair, performing a difference comparison of partitions of a target disk of the reference disk pair against the master image and obtaining a collection of differences. The method further includes writing the master image to each disk of a disk set in the computer being manufactured and applying the collection of differences to a target disk of the disk set.

20 Claims, 2 Drawing Sheets

MANUFACTURING PROCESS FOR SOFTWARE RAID DISK SETS IN A COMPUTER SYSTEM

BACKGROUND

This disclosure generally relates to computer system manufacturing, and more particularly, to an improved manufacturing process for software RAID1 disk sets.

In the computer arts, RAID is an acronym for "Redundant Array of Independent (or Inexpensive) Disks." Disk may be organized into several different types of arrays. One type is called "RAID 1." RAID 1 provides data redundancy by recording the same data on two or more disks. This process of multiple recording is sometimes called "mirroring" disks.

RAID 1 disk arrays may be implemented in hardware controllers or in the software of a computer's operating system.

RAID controllers, both hardware and software, organize the several physical disks into logical volumes which can be written and read by the application software. To describe this mapping of physical and logical disk drives, RAID controllers store some "metadata" on the disks describing the structure of each drive and its placement in the RAID array.

Hardware RAID controllers hide metadata on each disk drive of a RAID array, and on other non-volatile storage, so that the logical content of a logical disk does not contain the metadata. In this case, the logical content of each member of a RAID 1 array is identical to the logical content of any other member. The metadata does not need to be saved or restored within the logical disk data during the manufacturing process.

By contrast, RAID 1 control implemented in the operating system software stores the metadata inside the readable data on the disk. As a result, the logical contents of the disks in a software-managed RAID 1 array are not identical.

In one manufacturing process, all disks in a software RAID 1 mirror set are written with unique images. However, such a method of writing all disks in the mirror set with unique images increases the time to manufacture the computer system overall. Moreover, a typical solution in computer manufacturing is to write a separate image to each disk of a disk set. Because unique images are written in series, this takes twice as long for two disks as writing the single image into a hardware RAID controller.

With respect to software RAID 1, software RAID 1 is a feature in some computer server operating systems. In connection with the manufacture of computer servers having operating systems that employ software RAID, it is desirable to provide an improved ability to support configurations of soft-mirrored disks.

SUMMARY

A method of manufacturing a computer includes creating a reference two-disk software RAID pair, the software RAID pair having desired partitions mirrored by an operating system. The method also includes extracting a master image from one disk of the reference disk pair, performing a difference comparison of partitions of a target disk of the reference disk pair against the master image and obtaining a collection of differences. The method further includes writing the master image to each disk of a disk set in the computer being manufactured and applying the collection of differences to a target disk of the disk set.

A technical advantage of the method of the present disclosure is an improved manufacturing of a custom configured computer having a software RAID mirror disk set.

DETAILED DESCRIPTION

Figure 1:
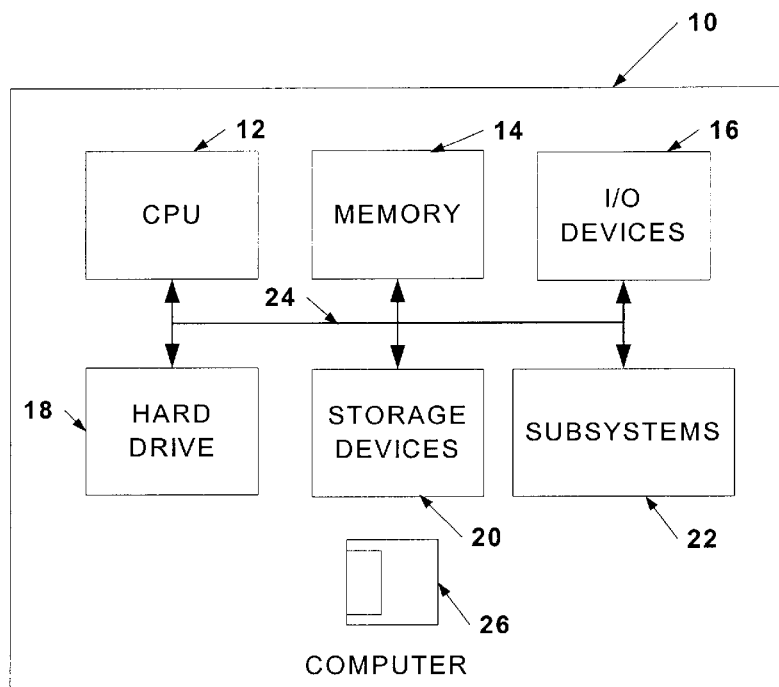
FIG. 1 is a block diagram view of a computer system manufactured according to one embodiment of the present disclosure.

In FIG. 1, a system block diagram of a computer system 10 is illustrated having features thereof configured in accordance with a custom configured computer system order or plan in a build to order manufacturing environment. The computer system 10 includes a central processing unit (CPU) 12, memory 14, input/output (I/O) devices, such as a display, a keyboard, a mouse, and associated controllers, collectively designated by a reference numeral 16, a hard disk drive 18, and other storage devices, such as may include a floppy disk drive, a CD-ROM drive, and the like, collectively designated by a reference numeral 20, and various other subsystems, such as a network interface card, collectively designated by a reference numeral 22, all interconnected via one or more buses, shown collectively as a bus 24. One or more computer readable media 26, such as a floppy disk, CD-ROM, or the like, is also included.

In a build to order computer system manufacturing environment, hardware components are installed into a target computer system. The particular hardware components are per a custom computer system order or plan. Predetermined files are downloaded onto the hard drive or storage device of the target system. The predetermined files are per the custom computer system order or plan, also. Subsequent to the download, the downloaded files are recomposed according to recomposition instructions, further as per the custom computer system order or plan. The process may further include testing prior to shipment to a customer.

According to one embodiment of the present disclosures, an improved manufacturing process for software RAID 1 disk sets takes into account prescribed characteristics of the several disks of a software RAID 1 disk set. The logical contents of the several disks in a mirror set are different, however, the logical contents are only slightly different. That is, most of the blocks of the disks are the same, however, some are different.

With respect to the embodiment described in the immediately preceding paragraph, a block of disks need not be limited to any one particular size. The embodiment can be run with any conceptual block size, from one bit or one byte to many thousands of bytes, etc. A reasonable and efficient engineering choice may be to select the smallest unit for the block size that the disk hardware can write in a single operation, or some small multiple of that unit. For example, a conventional small unit is a disk sector of 512 bytes. Accordingly, the block size may include one sector. Other block sizes are also possible.

Figure 2:
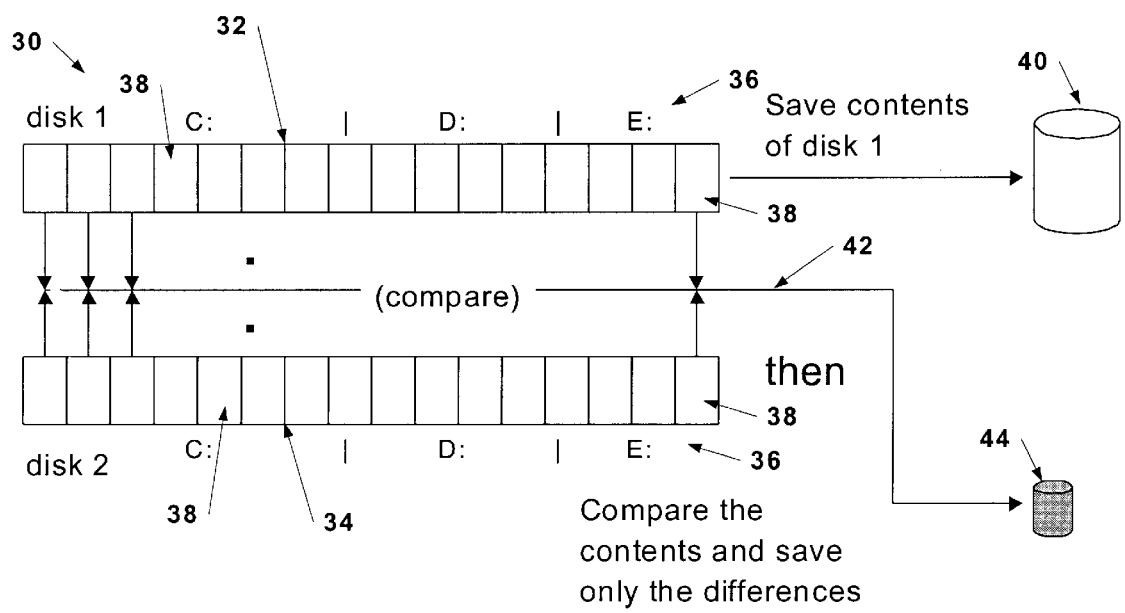
FIG. 2 is a diagrammatic view of a disk comparison operation in accordance with an embodiment of the present disclosure.

In FIG. 2, during manufacture of a computer system, a reference two-disk software RAID pair 30 is created. The software RAID pair 30 includes a first disk 32 and a second disk 34. The software RAID pair 30 includes all desired partitions 36 mirrored by an operating system. That is, each disk includes desired partitions 36, with each partition having blocks 38 containing content.

According to one embodiment, the reference two-disk software RAID pair includes a software RAID1 mirror pair. The software RAID1 mirror pair includes partitions mirrored by a server operating system. The operating system may include Linux, Windows NT™, Windows 2000™, or other operating system.

The manufacturing process extracts a master image 40 from one disk of the reference disk pair. For example, the master image 40 can be taken from disk 32 of the disk pair 30. The master image is stored for later use during the manufacturing process, further as discussed herein. The manufacturing process further performs a difference comparison 42 of partitions of a target disk of the reference disk pair against the master image and obtains a collection of differences 44. For example, performing the difference comparison and obtaining the collection of differences includes extracting locations and contents of blocks that are different between the disks of the reference pair.

Figure 3:
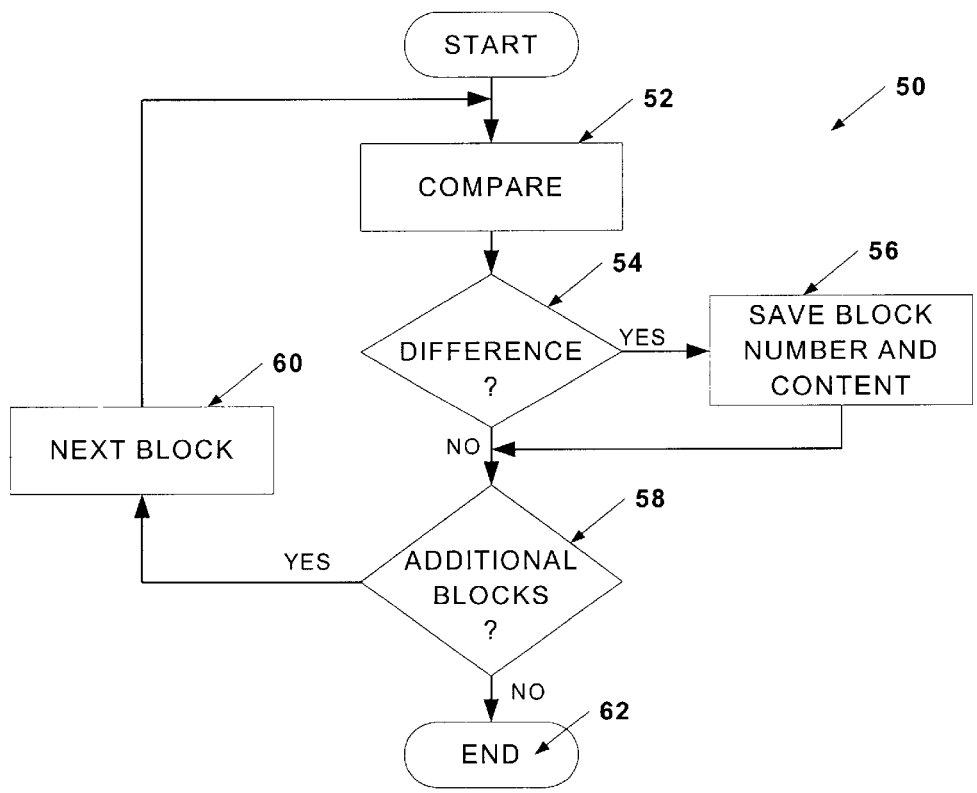
FIG. 3 is a flow diagram view of the comparison operation of FIG. 2.

FIG. 3 is a flow diagram view 50 of the comparison operation 42 of FIG. 2 in further detail, according to one embodiment. The process begins at step 52 with a comparison of a block of the first disk 32 with a corresponding block of the second disk 34. Step 54 includes a determination of whether the blocks compared in step 52 are different. If different, then the process advances to step 56. In step 56, a block identification number and the corresponding block's content are stored in a difference file. The process then proceeds to step 58. In step 58, a determination is made whether any additional blocks remain to be compared. If additional blocks remain, then in step 60, the process obtains a next block from the reference disk and the target disk and repeats the process at step 52. If no additional blocks remain in step 58, then the process ends at step 62.

Figure 4:
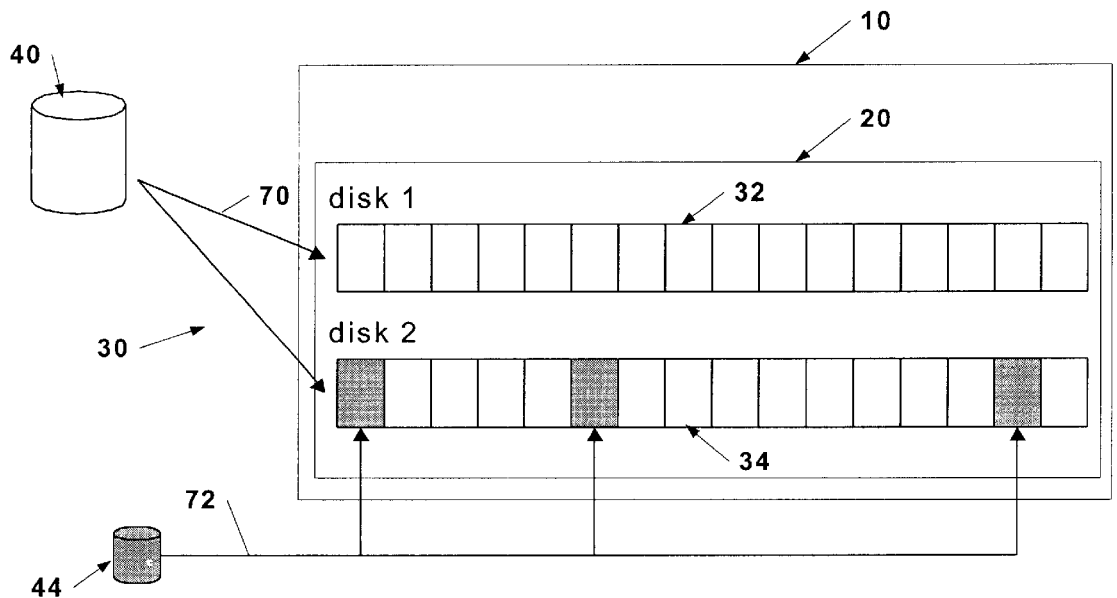
FIG. 4 is a diagrammatic view of manufacturing steps according to an embodiment the present disclosures.

FIG. 4 is a diagrammatic view of manufacturing steps according to an embodiment of the present disclosure. For example, during manufacturing of the computer system 10, the manufacturing process retrieves the master image 40 and writes the master image to each disk (32, 34) of the disk set 30 in the computer system 10 being manufactured, indicated for example, by reference numeral 70. In one instance, writing the master image to each disk of the disk set in the computer being manufactured occurs during a pre-installation of software images to the disks. In another embodiment, the master image is written to all disks of the disk set simultaneously. While this discussion has been with reference to two disks in a disk set, the disk set may also include an array of disks.

The manufacturing process then applies the collection of differences 44 to a target disk 34 of the disk set 30 of the computer system 10 being manufactured, indicated, for example, by reference numeral 72. In one embodiment, the process applies the collection of differences block by block to the target disk 34 in computer system 10 according to a respective block identification number and content.

As discussed herein, the computer system manufacturing process includes a number of steps. In connection with preparations for manufacturing of the software RAID1 disk set of a computer system, there are several preliminary development steps. In a first development step, the manufacturing process includes arbitrarily selecting one of the disks of the disk set to be the master image. The manufacturing process further includes a step of detecting which of the blocks in the image of the other disk(s) in the disk set are different. In one embodiment, the manufacturing process includes utilizing a black-box comparison of the disk contents between the master disk and the other target drive(s), that is, the other member(s) of the mirror set. The manufacturing process continues by storing the master image, in addition to storing only the differences between the master and each respective target disk.

During manufacturing, according to one embodiment, the process includes writing the master image to all the disk drives of the disk set in parallel. Upon completion of writing the master image to all of the disk drives of the disk set, the process then proceeds by repairing the images of the other target disk(s). The other target disk(s) corresponds to those disks other than the disk drive previously selected to contain the master image. Repairing of the images of the other target disk(s) is accomplished by writing the known differences over parts of the master image contained on a respective target disk.

For a two-disk mirror, a most common occurrence, the prior method of writing separate images to the two disks in manufacturing required twice the time of writing one image to one disk. With one embodiment of the method of the present disclosure, writing the master image to the two drives in parallel consumes on the order of the same amount of time as writing one drive. In addition, applying the known difference blocks to the second drive of the mirror pair consumes a very small fraction of the time to write an entire disk. For example, in one embodiment, the applied differences may consume on the order of less than one percent (1%) of time to write an entire disk.

The time to write disks in a computer manufacturing process grows linearly with software size and, in some cases, with disk size. According to one embodiment of the present disclosure, the technique can reduce the time required for the manufacturing of software RAID1 systems dramatically. Moreover, instead of two disks requiring two hundred percent (200%) of the processing time of one disk, one embodiment of the present disclosure requires on the order of one hundred and one percent (101%) of the processing time of one disk. The manufacture of a computer system having a two disk mirror set is shortened accordingly.

The performance benefit of the process according to one embodiment of the present disclosures is independent of other techniques that are also typically applied during these processes, such as data compression and decompression, writing only required blocks, etc.

EXAMPLE

According to one embodiment, process steps for a two-disk software RAID1 mirror pair include the following:

1. Create a master RAID1 pair in which desired partitions are mirrored by the computer operating system.
2. Extract a master image from one of the disks of the pair using a process appropriate to the manufacturing process of the server. For example, the master image may be extracted from disk 1 of the pair.
3. Execute a difference comparison of the partitions of the target disk against the master image. The target disk may include, for example, disk 2 of the pair. The difference comparison more particularly includes extracting the locations and contents of all the blocks that are different between disks.
4. During computer system manufacturing, write the master image to both disks of the disk set simultaneously. For example, using high-speed direct memory access (DMA) disk controllers, writing the master image to both disks does not increase the transfer time significantly.

Apply the collection of differences, block by block to the target disk. Because the set of difference blocks is very small compared with the entire disk, the additional time consumed by writing the difference blocks is also very small.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method of manufacturing a computer comprising:
   creating a reference two-disk software RAID pair, the software RAID pair having desired partitions mirrored by an operating system;
   extracting a master image from one disk of the reference disk pair;
   performing a difference comparison of partitions of a target disk of the reference disk pair against the master image and obtaining a collection of differences;
   writing the master image to each disk of a disk set in a computer being manufactured; and
   applying the collection of differences to a target disk of the disk set in the computer being manufactured.

2. The method of claim 1, wherein the reference two-disk software RAID pair includes a software RAID1 mirror pair.

3. The method of claim 2, further wherein the software RAID1 mirror pair includes partitions mirrored by a server operating system.

4. The method of claim 3, wherein the operating system is one selected from the group consisting of Linux, Windows NT™, and Windows 2000™.

5. The method of claim 1, wherein performing the difference comparison and obtaining the collection of differences includes extracting locations and contents of blocks that are different between the disks of the reference pair.

6. The method of claim 5, further wherein applying the collection of differences includes applying the collection of differences block by block to the target disk in the computer being manufactured.

7. The method of claim 1, wherein writing the master image to each disk of the disk set in a computer being manufactured occurs during a preinstallation of software images to the disks.

8. The method of claim 1, wherein the master image is written to all disks of the disk set simultaneously.

9. A method of manufacturing a computer comprising:
   creating a reference two-disk software RAID 1 mirror pair, the software RAID 1 mirror pair having desired partitions mirrored by an operating system;
   extracting a master image from one disk of the reference disk pair;
   performing a difference comparison of partitions of a target disk of the reference disk pair against the master image and obtaining a collection of differences, including extracting locations and contents of blocks that are different between the disks of the reference pair;
   writing the master image to each disk of a disk set in a computer being manufactured; and
   applying the collection of differences block by block to a target disk of said disk set in the computer being manufactured.

10. The method of claim 9, wherein the master image is written to all disks of the disk set simultaneously.

11. A computer system comprising:
    a processor; and
    a storage accessible by said processor, said storage including a software RAID mirror pair formed by:
      creating a reference two-disk software RAID pair, the software RAID pair having desired partitions mirrored by an operating system,
      extracting a master image from one disk of the reference disk pair,
      performing a difference comparison of partitions of a target disk of the reference disk pair against the master image and obtaining a collection of differences,
      writing the master image to each disk of a disk set in said computer, and
      applying the collection of differences to a target disk of the disk set in said computer.

12. The computer system of claim 11, wherein the reference two-disk software RAID pair includes a software RAID1 mirror pair.

13. The computer system of claim 12, further wherein the software RAID1 mirror pair includes partitions mirrored by a server operating system.

14. The computer system of claim 13, wherein the operating system is one selected from the group consisting of Linux, Windows NT™, and Windows 2000 ™.

15. The computer system of claim 11, wherein performing the difference comparison and obtaining the collection of differences includes extracting locations and contents of blocks that are different between the disks of the reference pair.

16. The computer system of claim 15, further wherein applying the collection of differences includes applying the collection of differences block by block to the target disk in the computer being manufactured.

17. The computer system of claim 11, wherein writing the master image to each disk of the disk set in a computer being manufactured occurs during a preinstallation of software images to the disks.

18. The computer system of claim 11, wherein the master image is written to all disks of the disk set simultaneously.

19. A computer system comprising:
    a processor; and
    a storage accessible by said processor, said storage including a software RAID mirror pair formed by:
      creating a reference two-disk software RAID1 mirror pair, the software RAID pair having desired partitions mirrored by an operating system,
      extracting a master image from one disk of the reference disk pair,
      performing a difference comparison of partitions of a target disk of the reference disk pair against the master image and obtaining a collection of differences, including extracting locations and contents of blocks that are different between the disks of the reference pair,
      writing the master image to each disk of a disk set in said computer, and
      applying the collection of differences block by block to a target disk of said disk set in said computer.

20. The computer system of claim 19, wherein the master image is written to all disks of the disk set simultaneously.

* * * * *